United States Patent
Lyra

(10) Patent No.: US 10,523,548 B2
(45) Date of Patent: Dec. 31, 2019

(54) CIRCUIT AND A METHOD FOR ATTACHING A TIME STAMP TO A TRACE MESSAGE

(71) Applicant: Intel IP Corporation, Santa Clara, CA (US)

(72) Inventor: Markus Lyra, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 395 days.

(21) Appl. No.: 15/350,318

(22) Filed: Nov. 14, 2016

(65) Prior Publication Data
US 2017/0180236 A1 Jun. 22, 2017

(30) Foreign Application Priority Data
Dec. 16, 2015 (DE) .................. 10 2015 121 940

(51) Int. Cl.
| | |
|---|---|
| *H04L 12/26* | (2006.01) |
| *H04L 12/823* | (2013.01) |
| *H04L 12/861* | (2013.01) |
| *H04L 29/08* | (2006.01) |

(52) U.S. Cl.
CPC .......... *H04L 43/106* (2013.01); *H04L 47/32* (2013.01); *H04L 49/90* (2013.01); *H04L 67/146* (2013.01)

(58) Field of Classification Search
CPC ....... H04L 43/106; H04L 47/32; H04L 49/90; H04L 67/146; H04L 1/08; H04L 43/0835; H04L 43/10; H04L 65/602; G06F 11/3636
See application file for complete search history.

(56) References Cited

U.S. PATENT DOCUMENTS

| | | | |
|---|---|---|---|
| 8,160,084 B2* | 4/2012 | Lindvall ............. | G06F 9/546 370/389 |
| 9,083,623 B2* | 7/2015 | Swoboda ............. | H04L 43/10 |
| 2006/0155843 A1* | 7/2006 | Glass ................. | G06F 11/25 709/224 |
| 2007/0140282 A1* | 6/2007 | Lakshmanamurthy ........ | H04L 47/562 370/412 |
| 2012/0216080 A1* | 8/2012 | Bansal .............. | G06F 11/3476 714/45 |

(Continued)

FOREIGN PATENT DOCUMENTS

WO 0063777 A1 10/2000

OTHER PUBLICATIONS

Foreign action dated Sep. 13, 2016 for Application No. 10 2015 121 940.9, and English translation attached.

*Primary Examiner* — Todd L Barker
(74) *Attorney, Agent, or Firm* — Schiff Hardin LLP

(57) ABSTRACT

A circuit including: a trace source configured to request a time stamp to correspond to a trace message; a time module configured to generate the time stamp and buffer the time stamp; and an attachment circuit configured to match the time stamp that corresponds to the trace message and attach the time stamp to the trace message. A method for attaching a time stamp to a trace message, the method including: requesting by a trace source a time stamp to correspond to a trace message; generating the time stamp in a time module; buffering the time stamp in the time module; matching the time stamp that corresponds to the trace message; and attaching the time stamp to the trace message.

17 Claims, 6 Drawing Sheets

(56) References Cited

U.S. PATENT DOCUMENTS

| | | | |
|---|---|---|---|
| 2012/0327949 A1* | 12/2012 | Korger | H04L 49/901 370/412 |
| 2013/0238946 A1* | 9/2013 | Swoboda | H04L 43/10 714/715 |
| 2013/0254596 A1* | 9/2013 | Eder | G06F 11/3636 714/45 |
| 2014/0115397 A1* | 4/2014 | Peck | G06F 11/3632 714/37 |
| 2014/0133844 A1* | 5/2014 | Dahlfort | H04L 43/0811 398/10 |
| 2015/0046617 A1* | 2/2015 | Shirlen | G06F 13/36 710/117 |
| 2015/0143343 A1* | 5/2015 | Weiss | G06F 11/3668 717/128 |
| 2016/0232073 A1* | 8/2016 | Cook | G06F 11/348 |

\* cited by examiner

US 10,523,548 B2

CIRCUIT AND A METHOD FOR ATTACHING A TIME STAMP TO A TRACE MESSAGE

TECHNICAL FIELD

Various aspects of this disclosure relate generally to a circuit and a method for attaching a time stamp to a trace message.

BACKGROUND

Verification and debugging in complex systems on a chip (SoC) usually utilize trace information from different SoC components. These components may be referred to as trace sources. The trace information may include various trace messages, which may be generated by the trace sources, and are routed through a trace routing network (e.g., a trace network on a chip (NoC)) to a trace output device or interface, which may be referred to as a trace target. The trace target may generate trace protocol and transmit trace information out of the SoC.

In trace analysis, it is significant that trace messages coming from different trace sources have accurate time stamps, for example, a time from a global time stamp may be provided for a trace message at the time of generation. This allows for exacting time correlation, i.e., accurate, among trace messages from different trace sources.

Providing a global time source in a trace target and attaching a time stamp when a trace message arrives at the trace target from a trace source may not be accurate as delays due to random routing and arbitration from the trace source to the trace target, e.g., through a trace routing network, could introduce a time gap between the generation of the trace message and the actual attachment of the time stamp. This may lead to a trace message with an inaccurate time stamp.

Some solutions to this issue suggest attaching the time stamp at the trace source. An implementation of this solution may route a global time stamp value, e.g., thirty-two signals over thirty-two interconnects to each trace source, e.g., to every trace source in the SoC, which would cross different power and clock domains. These interconnects complicate hardware design as the global time stamp lines require isolation and clock synchronization. Additionally, in an environment of increasing on-chip packing densities, routing congestion introduces complex issues.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
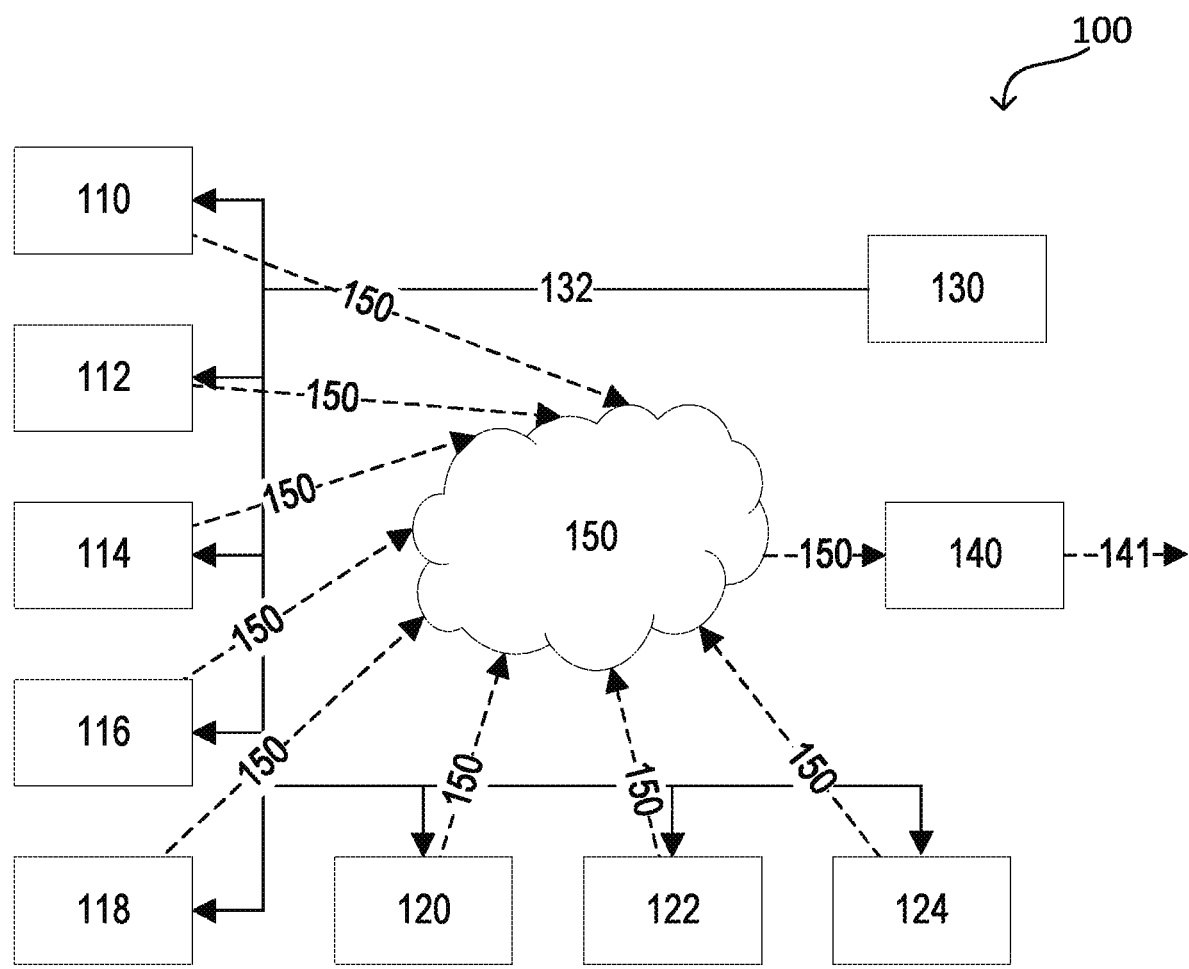
FIG. 1 shows a circuit 100 for attaching a time stamp to a trace message.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as, for example, Java. Any other kind of implementation of the respective functions which will be described in more detail below may also be understood as a "circuit". It is understood that any two (or more) of the described circuits may be combined into a single circuit with substantially equivalent functionality, and, conversely, that any single described circuit may be distributed into two (or more) separate circuits with substantially equivalent functionality. In particular with respect to the use of "circuitry" in the Claims included herein, the use of "circuit" may be understood as collectively referring to two or more circuits.

A "processing circuit" (or equivalently, "processing circuitry") as used herein, is understood as referring to any circuit that performs an operation(s) on signal(s), such as, e.g., any circuit that performs processing on an electrical signal or an optical signal. A processing circuit may thus refer to any analog or digital circuitry that alters a characteristic or property of an electrical or optical signal, which may include analog data, digital data, or a combination thereof. A processing circuit may thus refer to an analog circuit (explicitly referred to as "analog processing circuit (ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g., a processor or microprocessor). As utilized herein, "digital processing circuit(ry)" may refer to a circuit implemented using digital logic that performs processing on a signal, e.g., an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory". It is appreciated that a single component referred to as "memory" or "a memory" may be composed of more than one different type of memory, and thus may refer to a collective component including one or more types of memory. It is readily understood that any single memory component may be separate multiple collectively equivalent memory components, and vice versa. Furthermore, it is appreciated that while memory may be depicted, such as in the drawings, as separate from one or more other components, it is understood that memory may be integrated within another component, such as on a common integrated chip.

As used herein, "debugging" may be understood as identifying and resolving issues in a computer system, hardware operation, or software, e.g., including circuits such as an integrated circuit or an SoC. As used herein, "verification" may be understood as ensuring that a computer system, hardware operation, or software, fulfills given specifications. As used herein, "tracing" may be understood as forming a record of events, or log, that may be performed or executed by a computer system, hardware operation, or software. The log, or record of events, may also include a time at which the event occurred, for example to establish a chronological order of events. This data may be useful for "debugging" or "verification".

As used herein, "buffer" may be understood to be an element that temporarily stores data, e.g., a value, such as a time stamp. Data may be stored in the buffer and then later recalled. The "buffer" may be implemented as hardware, such as a circuit, or may be a "virtual buffer", e.g., implemented by software. An example of a hardware implementation may be physical memory, as discussed above, or a shift register. A "buffer" implemented by software may store the data in a physical memory, e.g., random access memory. The "buffer" may operate as a FIFO (first in, first out), i.e., data may be queued in the "buffer" by the order in which they were input to the "buffer", and then sequentially output. For example, if two values, such as time stamps, are in the "buffer", then the value that was first stored in the queue will also be the first value to be read out of the "buffer", i.e., a value may maintain a sequential position based on when the value entered the "buffer".

Various aspects of this disclosure provide an alternative that reduces routing congestion and routing complexity, while still providing accurate time stamps.

FIG. 1 shows a circuit 100 for attaching a time stamp to a trace message.

Circuit 100 contains a plurality of trace sources, such as trace source 110, trace source 112, trace source 114, trace source 116, trace source 118, trace source 120, trace source 122, and trace source 124, etc. (these trace sources may represent, e.g., any number of trace sources 1-$n$). The trace sources 110-124 (as listed above) may be individually connected to global time stamp counter 130 by time stamp value line 132. Time stamp value line 132 may be composed of thirty-two individual interconnections, or lines, which may each carry a bit of a time stamp. Time stamp value line 132 may be routed to each trace source and may regularly provide a time, i.e., the same global time, to each trace source.

Trace sources 110-124 may also be connected to a trace target 140 by a trace routing network 150. Trace routing network 150, e.g., a NoC, may route trace messages from the various trace sources 110-124 to trace target 140. As an example, a time stamp value may be provided to trace source 110 via time stamp value line 132 from global time stamp counter 130. Upon the generation of a trace message by trace source 110, the provided time may be concurrently attached to the generated trace message. The trace message, including the time stamp, is routed through trace routing network 150 to trace target 140, where it may be further transmitted or processed, for example, trace target 140 may have an output 141, for transmitting the trace message out of the SoC.

Alternatively, a trace source may indicate a trace message has been generated by sending a request signal, e.g., a time stamp latch request, to a global time stamp module (time module). Upon receipt of the latch request, the time stamp module may latch the current time, e.g., the time stamp counter value (or time stamp) in a buffer, which may be dedicated to the trace source. Once the corresponding trace message has been routed, e.g., via a trace routing network, and reaches, for example, a trace target, the previously latched time stamp value from a corresponding buffer (which may be selected by identifying a trace source identifier of the trace message) may be attached to the trace message. The request for a time stamp may reduce the need for routing the time stamp value to the trace source for attachment, thus reducing routing congestion and interference in, e.g., a SoC.

The time stamp buffer may be implemented as a FIFO (first in, first out). The depth of the FIFO, i.e., the number of time stamps the FIFO may hold, or buffer, may correspond to the maximum number of trace messages from a given trace source that are in transit. For example, if only one trace message is in transit, the FIFO may require only a single stage, and may thus be a latch.

Whenever a trace source generates a new trace message, the corresponding time stamp latch request (time stamp request) may insert the current, i.e., the time occurring at the instant of the request, into the buffer, e.g., a corresponding FIFO for the trace source.

As the generation of the trace message and the time stamp occur separately, for example in physically separate circuits, the global time stamp module may have buffering capabilities to maintain the time stamp value as the trace message is routed to, e.g., the trace target, or a circuit where the time stamp may be attached to the trace message. Upon arrival of the trace message at the, e.g., trace target, the previously inserted latched time stamp value (time stamp) may be read out of the FIFO and attached to the trace message.

Figure 2A:
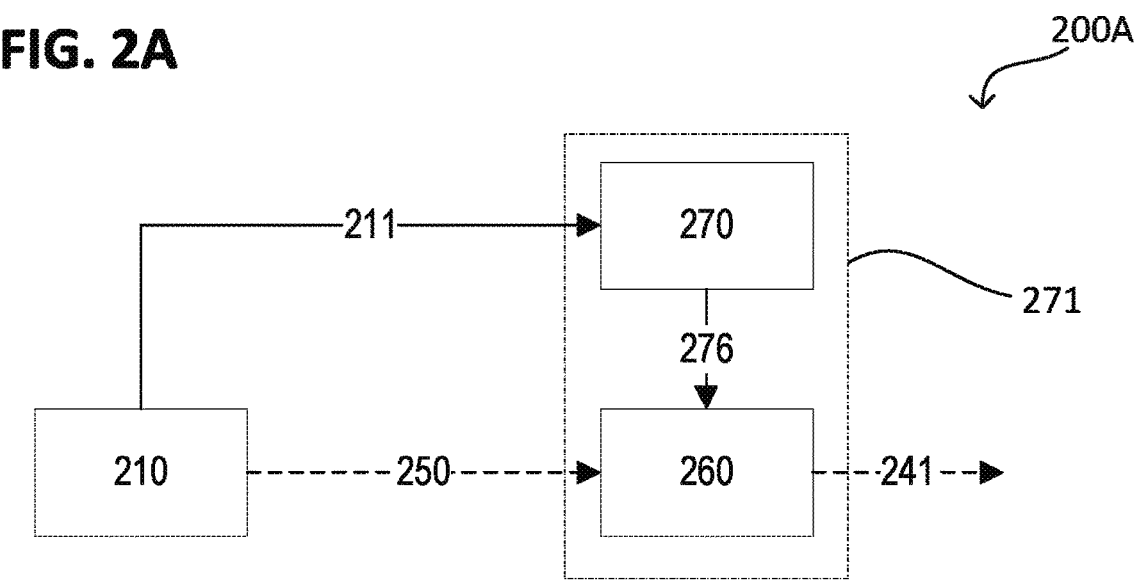
FIG. 2A shows a circuit 200A for attaching a time stamp to a trace message.

FIG. 2A shows a circuit 200A for attaching a time stamp to a trace message. Circuit 200A may include a trace source 210 configured to request a time stamp to correspond to a trace message; a time module 270 configured to generate the time stamp and buffer the time stamp; and an attachment circuit 260 configured to match the time stamp that corresponds to the trace message and attach the time stamp to the trace message. As depicted by the dashed and dotted box 271, time module 270 and attachment circuit 260 may be two separate circuits or may be implemented in a single equivalent circuit 271. Circuit 200A may include at least one additional (e.g., further) trace source (also discussed below).

The time stamp may indicate a time the trace message is generated. The trace message may include an event record executed by the trace source, for example: "DSP indicating finished processing of a radio or audio frame"; "interrupt arrival"; "setting of communication flags in shared memory"; "sending requests to other SoC components to start processing data"; "messages exchanged between various SoC components"; "signaling data availability"; "starting DMA (direct memory access)"; "DMA finished"; "reception of paging from the network"; "data received from or sent to the network", e.g., IP packet headers; "various software state changes"; and/or "occurrence of different events, including unexpected events/warnings/errors".

Trace source 210 may be external to time module 270, e.g., trace source 210 may be physically located in a part of a SoC separate from time module 270 or even external to the SoC. Trace source 210, therefore, transmits a request for the time stamp to time module 270. The request may be transmitted over an interconnect 211. Interconnect 211 may be a single interconnect, and may further be dedicated to transmitting the request. Interconnect 211 may be a wire.

Time module 270 may include a clock. Time module 270 may also include a buffer configured to queue the time stamp. The buffer may be a FIFO. The buffer may be implemented by various hardware, e.g., a latch; a shift register; a flip-flop or series of flip-flops; or a memory that may include a read and write pointer, memory, and a control circuit, or the memory may be static random access memory. The buffer may be further configured to queue at least one additional (e.g., a further) time stamp that corresponds to the trace source, i.e., the buffer may be able to queue (buffer, hold, or maintain) multiple time stamps. Additionally or alternatively, the time module may also include at least one additional (e.g., a further) buffer configured to queue a time stamp that corresponds to at least one additional (e.g., a further) trace source.

Circuit 200A may include a trace target (not depicted here, see below). The trace target may be configured to receive the trace message. The trace target may be configured to output the trace message, for example, via output 241, including the attached time stamp. The trace target may receive the time stamp from time module 270. The trace target may also generate trace protocol, such as MIPI STP protocol (Mobile Industry Processor Interface System Trace Protocol). If instances where trace bandwidth may be low, a serial protocol over UART (universal asynchronous receiver/transmitter) or USB (universal serial bus) may be generated. The trace message may be additionally encapsulated in a framing protocol which may allow synchronization on message boundaries and may offer integrity protection, such as HDLC (high-level data link control).

Alternatively, the attachment circuit 260 may be configured to receive the trace message via routing 250, e.g., a trace network or trace routing network. Attachment circuit 260 may be further configured to receive the time stamp corresponding to the trace message from time module 270, which may transmit the time stamp to attachment circuit 260, as depicted in arrow 276. The attachment circuit 260 may output the trace message including the attached time stamp via output 241.

The trace message may include a trace source identifier that identifies which trace source generated the trace message, e.g., trace source 210. The attachment circuit 260 may receive and match the trace message by the trace source identifier, e.g., transmit the trace source identifier to the time module 270, which may then dequeue the time stamp from the buffer that corresponds to the trace source of the trace message. The time stamp may be transmitted to the attachment circuit 260 for attachment to the trace message. Alternatively, a trace target may receive and match the trace message by the trace source identifier, e.g., transmit the trace source identifier to the time module 270, which may then dequeue the time stamp from the buffer that corresponds to the trace source of the trace message. The time stamp may be transmitted to the trace target for attachment to the trace message.

The trace network 250 may be configured to route the trace message from trace source 210. The trace message may be routed via trace network 250 to attachment circuit 260, or alternatively, to a trace target.

In an aspect of the disclosure, circuit 200A may include an implementation to ensure that a trace message is matched with the proper time stamp.

To ensure the correct latched time stamp (time stamp) is attached to the correct trace message, it may be ensured that the trace routing network does not drop any trace messages, e.g., via flow control and backpressure in the trace routing network. If this cannot be avoided, the trace routing network may provide an indication to the trace target of how many trace messages have been dropped per trace source. Utilizing this information, the trace target may read out and discard the corresponding number of latched time stamp values (time stamps) from the buffer, e.g., a FIFO.

Alternatively, if a trace message is silently dropped and the trace routing network cannot provide the information about the number of lost trace messages, this information may be provided by a message sequence number (MSN). The trace source may attach a monotonically increasing MSN value to each trace message and the trace target, for example, may keep track of the previously determined MSN value (the "last seen" MSN value). It may then be determined how many trace messages have been lost.

Additionally, if it cannot be avoided that trace messages are dropped in the trace routing network, the buffer, e.g., FIFOs, may need to be able to hold, e.g., buffer, more time stamp values to account for the trace messages in transit, as well as any trace messages which may have been lost, but not yet determined as such. These as-of-yet "unknown" lost trace messages still have corresponding time stamps occupying space in the buffer.

Additionally, in the event a large number of trace messages are dropped, a corresponding buffer holding the latched time stamp value (time stamps) may overflow. Such an event is likely to be an error situation, e.g., a misconfiguration or a hardware bug, and should be explicitly indicated as such in the trace stream. However, after an overflow, the buffer may be re-synchronized with the trace messages in transit. The MSNs may be used to match the buffered latched time stamp values (time stamps) to the corresponding trace message.

As discussed above, trace network 250 may indicate the trace message was dropped. Time module 270 may then discard the time stamp corresponding to the trace source from the buffer if the trace message was indicated as dropped.

Alternatively, the trace message may include a sequence identifier that indicates a sequential position of the trace message in a series of generated trace messages from the trace source 210. The time module 270 may then obtain the sequence identifier of the trace message for the trace source, track a previous sequence identifier of a previous trace message, and determine if the sequence identifier of the trace message sequentially follows the previous sequence identifier of the previous trace message. Time module 270 may further discard at least one time stamp, e.g., one or more time stamps that correspond to dropped time messages, from the buffer if the sequence identifier of the trace message does not sequentially follow the previous identifier of the previous trace message.

Circuit 200A may be implemented for tracing and debugging in various circuits, such as an integrated circuit, a system on a chip (SoC), a network on a chip (NoC), in a baseband modem, e.g., for a mobile communications device, a processor in a mobile communications device, or in a debugging system.

Figure 2B:
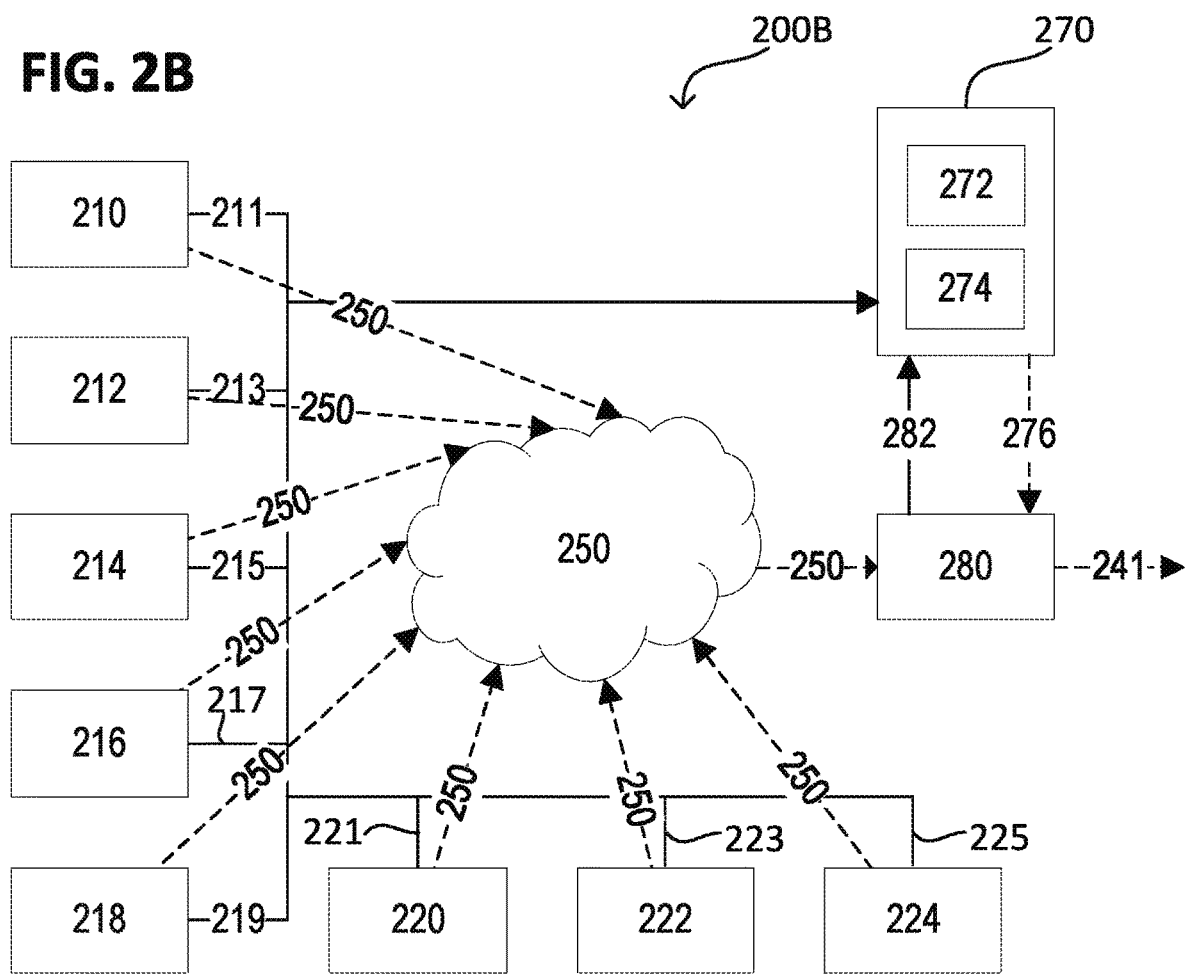
FIG. 2B shows a circuit 200B for attaching a time stamp to a trace message.

FIG. 2B shows a circuit 200B for attaching a time stamp to a trace message. Circuit 200B may include a trace source 210 configured to request a time stamp to correspond to a trace message; a time module 270 configured to generate the time stamp and buffer the time stamp; and a trace target 280 (or an attachment circuit 260, as discussed above) configured to match the time stamp that corresponds to the trace message and attach the time stamp to the trace message. Circuit 200B may be substantially the same or similar to circuit 200A, thus differences between the circuits will mainly be discussed below, while some aspects may be reviewed.

Circuit 200B may include at least one trace source or a plurality of trace sources: trace source 210, trace source 212, trace source 214, trace source 216, trace source 218, trace source 220, trace source 222, and trace source 224. The identified trace sources may be representative of any number of trace sources 1-n. Each trace source may have an interconnect, such as circuit 200A, where trace source 210 includes interconnect 211. Likewise, in circuit 200B, trace source 210 includes interconnect 211, trace source 212 includes interconnect 213, trace source 214 includes interconnect 215, trace source 216 includes interconnect 217, trace source 218 includes interconnect 219, trace source 220 includes interconnect 221, trace source 222 includes interconnect 223, and trace source 224 includes interconnect 225. The individual interconnects may be a single, dedicated wire, as discussed above. The interconnects may be routed to time module 270.

Time module 270 may include a clock 272 (or counter) and a buffer 274. Buffer 274 may be composed of a plurality of buffers, where each buffer corresponds to a trace source (discussed below). Clock 272 may provide the time for time stamps.

The trace sources may each generate respective trace messages which may be routed to trace target 280 via routing network 250. Trace target 280 may receive the trace messages from trace sources 210-224. As discussed above, the trace message may include a trace source identifier, e.g., trace source 216 may have a unique identifier, which may correspond to trace source 216 and a buffer, e.g., in buffer 274, that may include the corresponding time stamp for the trace message. Trace target 280 may then transmit this information to time module 270 as depicted by arrow 282, e.g., the trace source identifier or a signal corresponding to the appropriate buffer (in buffer 274). Time module 270 may then transmit the corresponding time stamp to trace target 280 as depicted by arrow 276 (or by attachment circuit 260, as discussed above). Trace target 280 may then output the trace message including the attached time stamp via output 241. Trace target 280 may also generate trace protocol.

Similar to circuit 200A above, trace network 250 may indicate if a trace message from one of trace sources 210-224 was dropped. Time module 270 may then discard the time stamp corresponding to the respective trace source, e.g., at least one of trace sources 210-224, from buffer 274 if the corresponding trace message was indicated as dropped.

In addition, similar to circuit 200A above, a trace message from the trace sources 210-224, may include individual sequence identifiers for each of the trace sources 210-224, that indicates a sequential position of the trace message in a series of generated trace messages from the relevant trace source. Time module 270 may obtain the sequence identifier of the trace message for the relevant (corresponding) trace source, track a previous sequence identifier of a previous trace message, and determine if the sequence identifier of the trace message sequentially follows the previous sequence identifier of the previous trace message. Buffer 274 may then discard at least one time stamp, e.g., from the corresponding buffer, if the sequence identifier of the trace message does not sequentially follow the previous sequence identifier of the previous trace message.

Circuit 200B may be implemented for tracing and debugging in various circuits, such as an integrated circuit, a system on a chip (SoC), a network on a chip (NoC), in a baseband modem, e.g., for a mobile communications device, a processor in a mobile communications device, or in a debugging system.

Figure 3:
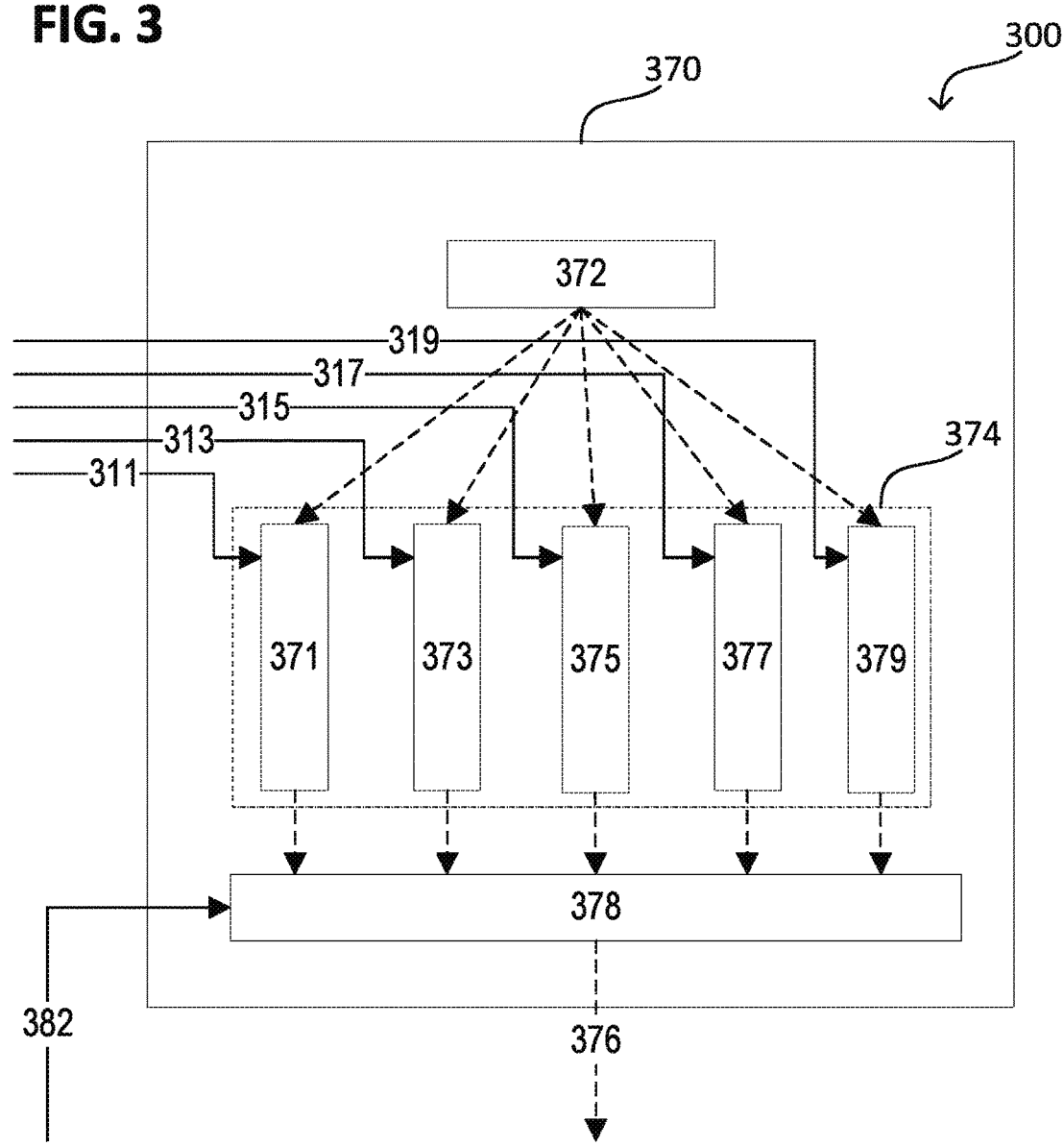
FIG. 3 shows part of a circuit 300 including a time module.

FIG. 3 shows part of a circuit 300 including time module 370.

Time module 370 may be the same or substantially similar to time module 270 in circuits 200A and 200B. Time module 370 may include clock 372 (or counter), as well as buffer 374.

Buffer 374 may include a plurality of buffers, such as buffer 371, buffer 373, buffer 375, buffer 377, and buffer 379. Each buffer may correspond to a trace source. Although five buffers (buffers 371-379 of buffer 374) are depicted, they may represent any number of buffers 1-n, and may correspond to the number of trace sources. The individual trace sources may include interconnects which may be connected to time module 370, e.g., to a common controller for buffer 374, or directly to the respective buffers. For example, interconnect 311 may be connected to buffer 371, interconnect 313 may be connected to buffer 373, interconnect 315 may be connected to buffer 375, interconnect 317 may be connected to buffer 377, and interconnect 319 may be connected to buffer 379. Each interconnect may be a single transmission line and may be dedicated to a trace source for time stamp requests (e.g., a latch request). Each interconnect may be a wire.

The individual buffers of buffer 374 may receive the time from clock 372, e.g., for the time stamp, and upon receipt of a request, e.g., from interconnect 313, a time stamp may be held in the buffer 373 for the corresponding trace message from the corresponding trace source. The individual buffers may queue the time stamp. The individual buffers may be a FIFO. The individual buffers may be implemented by various hardware, e.g., a latch; a shift register; a flip-flop or series of flip-flops; or a memory that may include a read and write pointer, memory, and a control circuit, or the memory may be static random access memory. The individual buffers may be further configured to queue at least one additional time stamp that corresponds to the relevant trace source, i.e., the buffer may be able to queue (buffer, hold, or maintain) multiple time stamps. The buffer may be able to queue the number of time stamps corresponding to the number of trace messages that are in transit from a particular trace source to the time module 370 via a routing network. Additionally or alternatively, the individual buffers may also take into account space for extra time stamps that may correspond to trace messages that may have been dropped during routing.

The individual buffers of buffer 374 may also discard time stamps that may have been determined to correspond to dropped trace messages, e.g., based on a sequence identifier or a trace message identified as dropped by a trace network as discussed above in relation to circuits 200A and 200B.

If a trace message does arrive, for example at a trace target or an attachment circuit, the trace source identifier or a signal identifying the buffer of buffer 374 that corresponds to the trace source identifier may be transmitted to time stamp selector 378, as depicted by arrow 382, i.e., the trace source identifier matches a trace message with the corresponding buffer that contains the time stamp for the trace message. Time stamp selector 378 may then retrieve the corresponding time stamp from the corresponding buffer and transmit it further, as depicted in arrow 376, to a trace target or attachment circuit, as discussed above, for attachment to the trace message.

Figure 4:
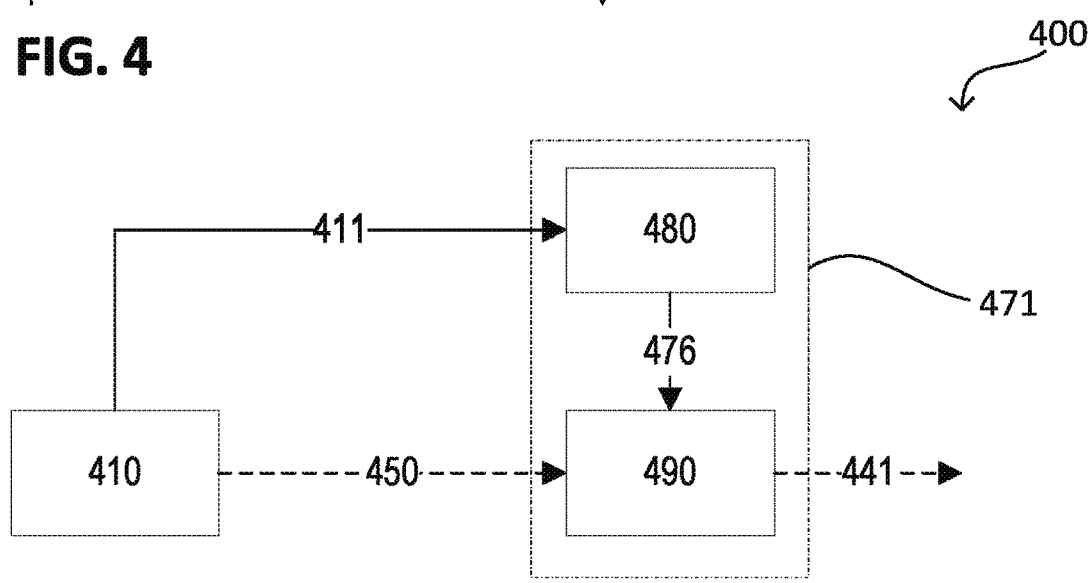
FIG. 4 shows a circuit 400 for attaching a time stamp to a trace message.

FIG. 4 shows a circuit 400 for attaching a time stamp to a trace message. Circuit 400 may include a trace source 410 configured to request a time stamp to correspond to a trace message, a time means 480 for remotely generating and buffering the time stamp, and an attachment means 490 for matching the time stamp that corresponds to the trace message and attaching the time stamp to the trace message. As depicted by the dashed and dotted box 471, time means 480 and attachment circuit 490 may be two separate circuits or may be implemented in a single equivalent circuit 471. Circuit 400 may include at least one additional trace source.

Trace source 410 may be external to time means 480. Trace source 410 may transmit a request for the time stamp to time means 480. The request may be transmitted on a single, dedicated interconnect 411, which may be a wire.

The time stamp may indicate a time the trace message is generated. The trace message may include an event record executed by the trace source 410, for example: "DSP indicating finished processing of a radio or audio frame"; "interrupt arrival"; "setting of communication flags in shared memory"; "sending requests to other SoC components to start processing data"; "messages exchanged between various SoC components"; "signaling data availability"; "starting DMA (direct memory access)"; "DMA finished"; "reception of paging from the network"; "data received from or sent to the network", e.g., IP packet headers; "various software state changes"; and/or "occurrence of different events, including unexpected events/warnings/errors".

Circuit 400 may include a trace target that may receive the trace message. A trace network 450 may route the trace message to the trace target, which may then output the trace message and the time stamp attached to the message via output 441. The trace message may include a trace source identifier. The trace target may receive and match the trace message with the time stamp by the trace source identifier.

Alternatively, attachment means 490 may receive the trace message. The trace network 450 may route the trace message to the attachment means 490, which may then output the trace message with the attached time stamp via output 441. The trace message may include a trace source identifier. The attachment means 490 may receive and match the trace message with the time stamp by the trace source identifier.

The trace network may be configured to indicate if the trace message was dropped. The time means 480 may then discard the time stamp corresponding to the trace source if the trace message was indicated as dropped. Alternatively, the indication of the dropped trace message may be received by a trace target.

Alternatively, the trace message may include a sequence identifier that indicates a sequential position of the trace message in a series of generated trace messages from the trace source. The time means 480 may obtain the sequence identifier of the trace message for the trace source 410, track a previous sequence identifier of a previous trace message, and determine if the sequence identifier of the trace message sequentially follows the previous sequence identifier of the previous trace message. Time means 480 may then discard at least one time stamp if the sequence identifier of the trace message does not sequentially follow the previous sequence identifier of the previous trace message.

Time means 480 may include a clock or counter for generating a time stamp. Time means 480 may utilize a regular, periodic signal to track time and generate the time stamp. The periodic signal (e.g., a time signal) may be produced internally to time means 480 or may be provided by an external source.

Time means 480 may include a buffer for buffering the time stamp, i.e., an implementation that may hold the time stamp until such time that the trace message arrives and the time stamp is attached to the trace message or until time means 480 receives an indication or determination that the trace message is dropped and the value (time stamp) should be discarded. Time means 480 may include a buffer configured to queue the time stamp. The buffer may be a FIFO. The buffer may be implemented by various hardware, e.g., a latch; a shift register; a flip-flop or series of flip-flops; or a memory that may include a read and write pointer, memory, and a control circuit, or the memory may be static random access memory. The buffer may be further configured to queue at least one additional time stamp that corresponds to the trace source, i.e., the buffer may be able to queue (buffer, hold, or maintain) multiple time stamps.

Attachment means 490 may include a circuit configured to match the time stamp that corresponds to the trace message and attach the time stamp to the trace message. Attachment means 490 may be connected to trace network 450, from which, attachment means 490 may receive the trace message. The circuit of attachment means 490 may be configured to obtain a trace source identifier from the trace message and transmit the trace source identifier, or a signal indicating the trace source identifier, to the time means 480. Time means 480 may then dequeue the time stamp from the buffer that corresponds to the trace source of the trace message. The circuit of attachment means 490 may be configured to then receive the time stamp from time means 480. The circuit of attachment means 490 may then be configured to add the time stamp, i.e., bits indicating the time the trace message was generated, to the trace message, e.g., add a string of values indicating the time stamp to the trace message.

Circuit 400 may be implemented for tracing and debugging in various circuits, such as an integrated circuit, a system on a chip (SoC), a network on a chip (NoC), in a baseband modem, e.g., for a mobile communications device, a processor in a mobile communications device, or in a debugging system.

Figure 5:
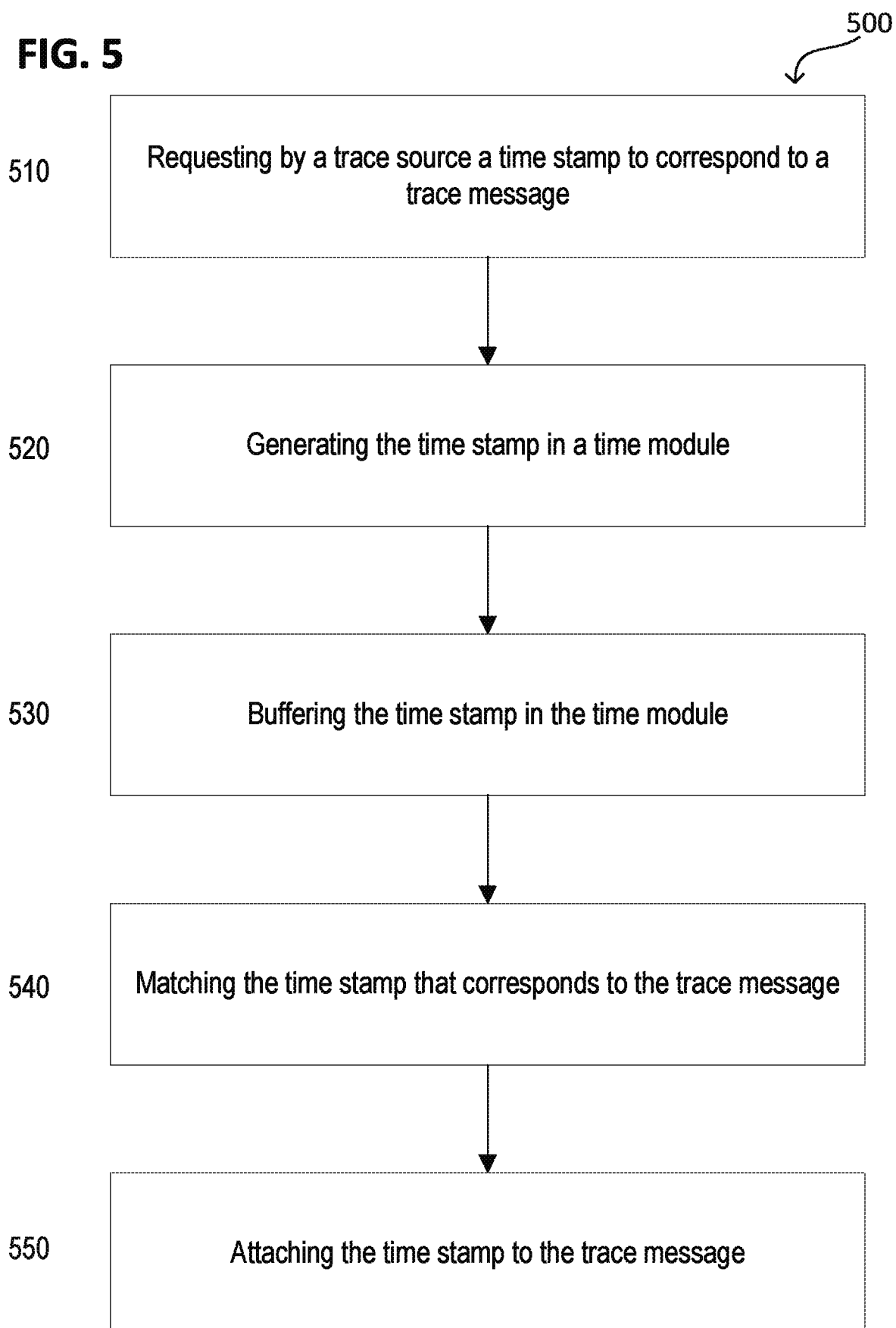
FIG. 5 shows a method 500 for attaching a time stamp to a trace message.

FIG. 5 shows a method 500 for attaching a time stamp to a trace message. Method 500 includes requesting by a trace source a time stamp to correspond to a trace message 510, generating the time stamp in a time module 520, buffering the time stamp in the time module 530, matching the time stamp that corresponds to the trace message 540, and attaching the time stamp to the trace message 550.

The time stamp may be requested by the trace source that generates the trace message. The trace source may be external to the time module and may transmit a request for the time stamp to the time module. The request may be transmitted on a single, dedicated interconnect, which may be a wire.

The time stamp may indicate a time the trace message is generated. The time stamp may be requested by one of a plurality of trace sources. The trace message may indicate an event record executed by the trace source, for example: "DSP indicating finished processing of a radio or audio frame"; "interrupt arrival"; "setting of communication flags in shared memory"; "sending requests to other SoC components to start processing data"; "messages exchanged between various SoC components"; "signaling data availability"; "starting DMA (direct memory access)"; "DMA finished"; "reception of paging from the network"; "data received from or sent to the network", e.g., IP packet headers; "various software state changes"; and/or "occurrence of different events, including unexpected events/warnings/errors".

The time module may include a clock, as well as a buffer configured to queue the time stamp. The buffer may be a FIFO. The buffer may be implemented by various hardware, e.g., a latch; a shift register; a flip-flop or series of flip-flops; or a memory that may include a read and write pointer, memory, and a control circuit, or the memory may be static random access memory. The buffer may be further configured to queue at least one additional time stamp that corresponds to the trace source, i.e., the buffer may be able to queue (buffer, hold, or maintain) multiple time stamps. The time module may include at least one additional buffer configured to queue a time stamp that corresponds to at least one additional trace source.

Matching the time stamp may include receiving the trace message and identifying the trace source that corresponds to the trace message. The trace message may include a trace source identifier. An attachment circuit or a trace target may receive and match the trace message by the trace source identifier. To attach the time stamp to the trace message, the time stamp may be dequeued from the buffer that corresponds to the trace message. The attachment circuit or trace target may then attach the time stamp to the trace message. The trace message may be routed via a trace network from the trace source. The trace network may indicate the trace message was dropped and the time stamp corresponding to the trace source may be discarded from the buffer.

The trace network may indicate to the time module or trace target that a trace message was dropped. The time module may then discard the time stamp corresponding to the dropped trace message.

Alternatively, the method 500 may include attaching a sequence identifier to the trace message that indicates a sequential position of the trace message in a series of generated trace messages from the trace source. The trace source may attach the sequence identifier. Matching the time stamp may further include obtaining the sequence identifier of the trace message for the trace source, tracking a previous sequence identifier of a previous trace message, and determining if the sequence identifier of the trace message sequentially follows the previous sequence identifier of the previous trace message. Method 500 may further include discarding at least one time stamp from the buffer if the sequence identifier of the trace message does not sequentially follow the previous sequence identifier of the previous trace message.

Method 500 may be performed for tracing and debugging in various circuits, such as an integrated circuit, a system on a chip (SoC), a network on a chip (NoC), in a baseband modem, e.g., for a mobile communications device, a processor in a mobile communications device, or in a debugging system. Method 500 may be a non-transitory computer readable medium configured to perform the method as discussed above.

Figure 6:
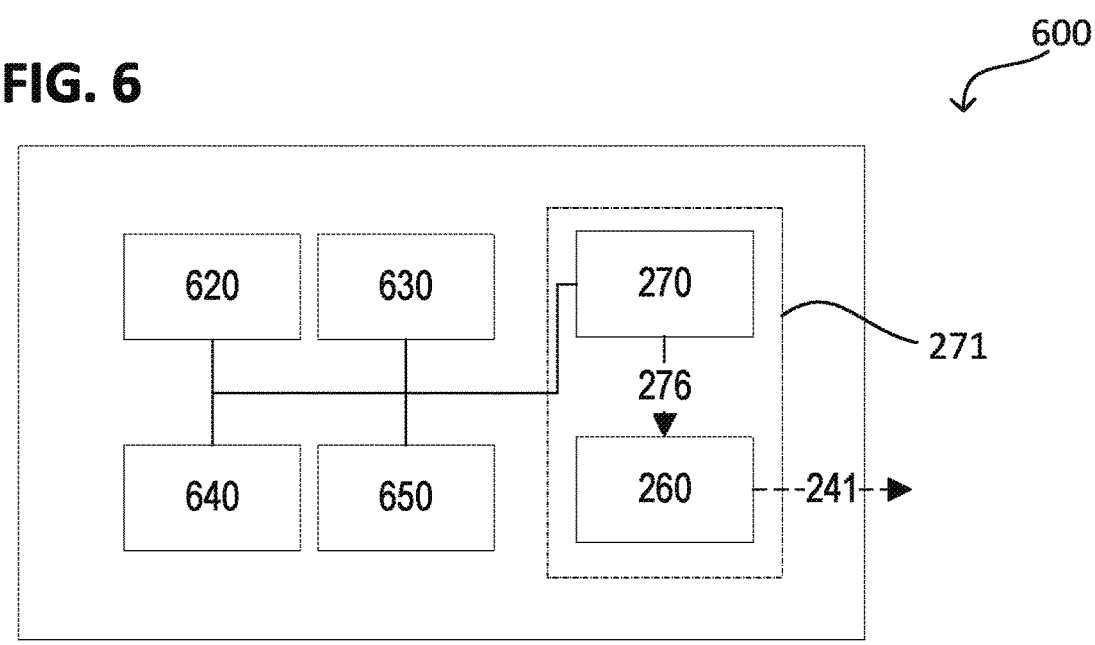
FIG. 6 shows a system on a chip 600 including a circuit for attaching a time stamp to a trace message.

As discussed above, circuits 200A, 200B, and 400, as well as method 500, may be implemented in a SoC. FIG. 6 shows a system on a chip 600 with an exemplary implementation of circuit 200A (similarly, circuit 200B, circuit 400, and method 500, may also be implemented in system on a chip 600). System on a chip 600 may include a processor 620, an external interface 630, power management 640, and memory 650.

System on a chip 600 may include all usual components of an electronic system or computer on a single chip, or substrate (e.g., typical components that may be required to operate a computational system. For example, processor 620 may be a processing circuit, or a central processing unit, as discussed above. External interface 630 may include inputs and outputs (e.g., physical contacts or wireless contacts) for the system on a chip 600. External interface 630 may further include processing circuitry for managing the input and out of data from system on a chip 600, e.g., for a communications network or interfaces for hardware external to the system on a chip 600. SoC 600 may also include power management 640, which may regulate the power supply to the various components of the system on a chip 600. Power management 640 may optimize the power supply of components in SoC 600, for example, reduce power consumption and heat generation, where performance allows. Power management 640 may include, for example, voltage regulators, or software implemented by hardware to control, e.g., clock rate. System on a chip 600 may also include memory 650, as discussed above.

Processor 620, external interface 630, power management 640, and memory 650, may be considered trace sources, and individual components within processor 620, external interface 630, power management 640, and memory 650, may also be trace sources. These components may request a time stamp to correspond to a trace message. The request for a time stamp may be transmitted, e.g., to time module 270, via an interconnect, e.g., interconnect 211, as discussed above. Time module 270 may generate the time stamp and buffer it until the corresponding trace message arrives. The trace message may arrive at attachment circuit 260, e.g., via a trace network 250, or other connection from the various trace sources, e.g., processor 620, external interface 630, power management 640, and memory 650. As discussed above, attachment circuit 260 may be configured to match the time stamp that corresponds to the trace message and attach the time stamp to the trace message. Output 241 may output the trace message with the attached time stamp, as well as trace protocol. Output 241 may be separate from external interface 630, may be incorporated into external interface 630, or may utilize external interface 630 to output the trace message with the attached time stamp (or some combination of the above). Additionally or alternatively, output 241 may stream the trace messages with the attached time stamp to memory 650, which may include, for example, a circular buffer.

Figure 7:
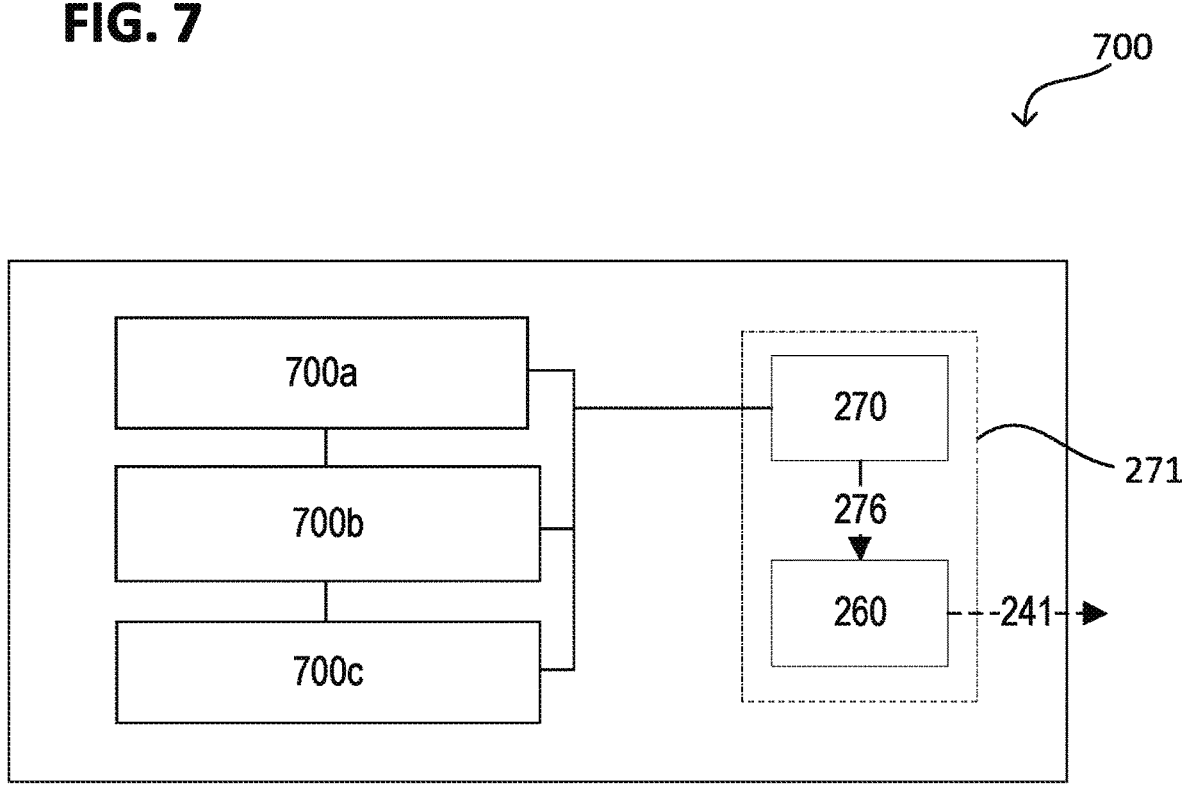
FIG. 7 shows a baseband modem 700 including a circuit for attaching a time stamp to a trace message.

FIG. 7 shows a baseband modem 700 (baseband processing circuit) with an exemplary implementation of circuit 200A (similarly, circuit 200B, circuit 400, and method 500, may also be implemented in baseband modem 700). Baseband modem 700 may include digital processing circuit(s) 700a (i.e., one or more digital processing circuits), protocol processor 700b, and baseband memory 700c. Although not explicitly shown in FIG. 7, baseband modem 700 may contain one or more additional components, including, e.g., one or more analog processing circuits.

Digital processing circuit(s) 700a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 700a may include hardware, software, or a combination of hardware and software. Specifically, digital processing circuit(s) 700a of baseband modem 700 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of ordinary skill in the art will appreciate the corresponding structure disclosed herein, be it in explicit reference to a physical structure and/or in the form of mathematical formulas, prose, flow charts, or any other manner providing sufficient structure (such as, e.g., regarding an algorithm). The components of baseband modem 700 may be detailed herein substantially in terms of functional operation in recognition that a person of ordinary skill in the art may readily appreciate the various possible structural realizations of baseband modem 700 using digital processing circuitry that will provide the desired functionality.

Baseband modem 700 may be configured to operate one or more protocol stacks, such as a GSM protocol stack, a UMTS protocol stack, an LTE protocol stack, etc. Baseband modem 700 may be "multi-mode" and may thus be configured to operate in accordance with multiple RATs by executing multiple protocol stack instances simultaneously. Accordingly, protocol processor 700b may be provided in order to execute one or more protocol stack instances. Protocol processor 700b may be, e.g., a processor, microprocessor, controller, microcontroller, Central Processing Unit (CPU), etc. For example, protocol processor 700b may be a microcontroller, and, therefore, may include a processor core, memory, and programmable input/output peripherals. Protocol processor 700b may be configured to execute the one or more protocol stack instances by executing program code corresponding to the one or more protocol stack instances, such as program code stored in an internal memory of protocol processor 700b (e.g., for protocol processor 700b implemented as a microcontroller) or in baseband memory 700c. By executing the one or more protocol stack instances, protocol processor 700b may act as a controller for operations of baseband modem 700, and may accordingly directly and/or indirectly control operations of digital processing circuit(s) 700a, baseband memory 700c, an antenna (e.g., antenna 804, discussed below), an RF transceiver (e.g., RF transceiver 806, discussed below), other audio/video components (e.g., audio transducers including microphone(s) and/or speaker(s)), an application processor (e.g., application processor 802, discussed below), etc.).

Baseband memory 700c may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s), etc., or any combination thereof. Baseband memory 700 may be configured to store software elements, which may be retrieved and executed using a processor component of digital processing circuit(s) 700a. Although depicted as a single component in FIG. 7, baseband memory 700c may be implemented as one or more separate components in baseband modem 700. Baseband memory 700c may also be partially or fully integrated with digital processing circuit(s) 700a.

As will be detailed, baseband modem 700 may include one or more digital processing circuits (digital processing circuit(s) 700a and/or protocol processor 700b) and a memory (baseband memory 700c).

It is appreciated that the aforementioned components of baseband modem 700 may be implemented in a number of different manners, such as by hardware, firmware, software executed on hardware (e.g., a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

Baseband modem 700 may also include, for example, circuit 200A including: time module 270, attachment circuit 260, and output 241, etc. Digital processing circuit 700a, protocol processor 700b, and memory 700c, may be considered trace sources, and individual components within digital processing circuit 700a, protocol processor 700b, and memory 700c, may also be trace sources. These components may request a time stamp to correspond to a trace message. The request for a time stamp may be transmitted, e.g., to time module 270, via an interconnect, e.g., interconnect 211 (as discussed above). Time module 270 may generate the time stamp and buffer it until the corresponding trace message arrives. The trace message may arrive at attachment circuit 260, e.g., via a trace network 250, or other connection from the various trace sources, e.g., digital processing circuit 700a, protocol processor 700b, and memory 700c. As discussed above, attachment circuit 260 may be configured to match the time stamp that corresponds to the trace message and attach the time stamp to the trace message. Output 241 may output the trace message with the attached time stamp, as well as trace protocol.

Figure 8:
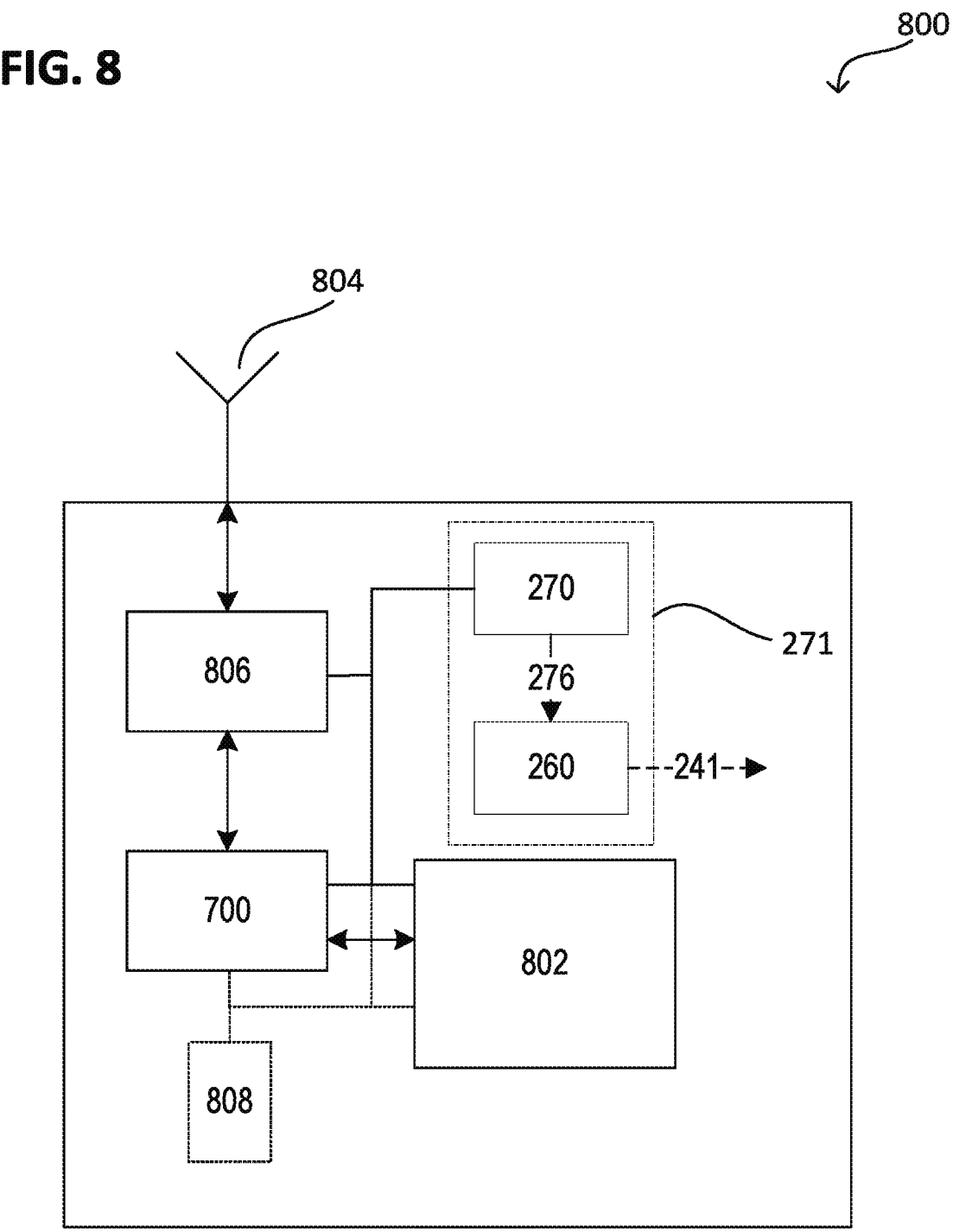
FIG. 8 shows a mobile communications device 800 including a circuit for attaching a time stamp to a trace message.

FIG. 8 shows a mobile communications device 800, which may include antenna 804, radio frequency (RF) transceiver 806, baseband modem 700, application processor 802, subscriber identity module (SIM) 808 (which may be optional), and, as an example, circuit 200A (similarly, circuit 200B, circuit 400, and method 500, may also be implemented in mobile communications device 800), which may include time module 270, attachment circuit 260, and output 241, etc. Baseband modem 700 may be the same or similar to baseband modem 700 discussed above. The exemplary circuit 200A described above in baseband modem 700 may be separate from the example provided here (i.e., may provide trace messages with time stamps for baseband modem 700, e.g., exclusively). Alternatively, the exemplary circuit 200A in FIG. 8 may be implemented for all the components of mobile communications device 800. Mobile communications device 800 may be user equipment or a mobile station, or a base station.

As shown in FIG. 8, the aforementioned components of mobile communications device 800 may be implemented as separate components. However, it is to be appreciated the architecture of mobile communications device 800 depicted in FIG. 8 is for explanatory purposes. Therefore, one or more of the aforementioned components of mobile communications device 800 may be integrated into a single equivalent component or divided into two separate components with collective equivalence. It is understood mobile communications device 800 may have one or more additional components, such as additional hardware, software, or firmware elements. For example, mobile communications device 800 may further include various additional components including hardware, firmware, processors, microprocessors, memory, and other specialty or generic hardware, processors, or circuits, etc., in order to support a variety of additional operations. Mobile communications device 800 may also include a variety of user input or output devices (display(s), keypad(s), touchscreen(s), speaker(s), external button(s), camera(s), microphone(s), peripheral device(s), memory, power supply, external device interface(s), subscriber identify module(s) (SIM), etc.).

It is appreciated that the aforementioned components of mobile communications device 800, in particular, RF transceiver 806, baseband modem 700, and application processor 802, may be implemented in a number of different manners, such as by hardware, firmware, software executed on hardware (e.g., a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile communications device 800 may be a mobile communications device having a radio processing circuit (RF transceiver 806) and a baseband processing circuit (baseband modem 700) adapted to interact with the radio processing circuit.

In an aspect of the disclosure providing an overview of the operation of mobile communications device 800; mobile communications device 800 may be configured to receive and/or transmit wireless signals according to multiple wireless access protocols or radio access technologies (RATs) that differ, including any one of, or any combination of, LTE (Long Term Evolution), WLAN (wireless local area network), Wi-Fi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile communications device 800 may be determined by one or more Subscriber Identity Modules (SIM) included in mobile communications device 800.

It is appreciated that separate components may be provided for each distinct type of compatible wireless signals, such as a dedicated LTE antenna, RF transceiver, and baseband modem for LTE reception and transmission, and a dedicated 2G antenna, RF transceiver, and baseband modem for 2G reception and transmission. Alternatively, one or more components of mobile communications device 800 may be shared between different wireless access protocols, such as, e.g., by sharing antenna 804 between multiple different wireless access protocols. In an exemplary aspect of the disclosure, RF transceiver 806 and/or baseband modem 700 may be operated according to multiple mobile communication access protocols (i.e., "multi-mode"), and thus may be configured to support one or more of LTE, UMTS, and/or GSM access protocols.

In one aspect of the disclosure, mobile communications device 800 may have at least one transmitter and at least one receiver, e.g., a transceiver. In another aspect of the disclosure, the mobile communications device 800 may have a single transmit antenna, yet have at least one receiver, e.g., two receivers. In another aspect of the disclosure, mobile communications device 800 may have at least one transmitter, e.g., two transmitters.

Furthermore, RF transceiver 806 may receive radio frequency wireless signals via antenna 804, which may be implemented as, e.g., a single antenna or an antenna array composed of multiple antennas. RF transceiver 806 may include various reception circuitry elements, which may include, e.g., analog circuitry, configured to process externally received signals; and mixing circuity, configured to convert externally received RF signals to baseband and/or intermediate frequencies. RF transceiver 806 may also include amplification circuitry to amplify externally received signals, such as power amplifiers (PAs) and/or Low Noise Amplifiers (LNAs), although it is appreciated that such components may also be implemented separately. RF transceiver 806 may additionally include various transmission circuitry elements configured to transmit internally received signals, such as, e.g., baseband and/or intermediate frequency signals provided by baseband modem 700, which may include mixing circuitry to modulate internally received signals onto one or more radio frequency carrier waves and/or amplification circuitry to amplify internally received signals before transmission. RF transceiver 806 may provide such signals to antenna 804 for wireless transmission. Further references herein to reception and/or transmission of wireless signals by mobile communications device 800 may thus be understood as an interaction between antenna 804, RF transceiver 806, and baseband modem 700 as detailed above. Although not explicitly depicted in FIG. 8, RF transceiver 806 may be additionally be connected to application processor 802.

Application processor 802 may be implemented as a Central Processing Unit (CPU), and may function as a controller for mobile communications device 800. Application processor 802 may be configured to execute various applications and/or programs of mobile communications device 800, such as, e.g., applications corresponding to program code stored in a memory component of mobile communications device 800 (not explicitly shown in FIG. 8). Application processor 802 may also be configured to control one or more further components of mobile communications device 800, such as user input/output devices (display(s), keypad(s), touchscreen(s), speaker(s), external button(s), camera(s), microphone(s), etc.), peripheral devices, memory, power supply, external device interfaces, etc.

Although baseband modem 700 and application processor 802 are depicted separately in FIG. 8, it is appreciated that this illustration is not limiting in nature. Accordingly, it is understood that baseband modem 700 and application processor 802 may be implemented separately, implemented together (i.e., as an integrated unit), or partially implemented together.

Mobile communications device 800 may also include, for example, circuit 200A including: time module 270, attachment circuit 260, and output 241, etc. RF transceiver 806, baseband modem 700, application processor, and optional SIM 808, may be considered trace sources and individual components within RF transceiver 806, baseband modem 700, application processor, and optional SIM 808, may also be trace sources. These components may request a time stamp to correspond to a trace message. The request for a time stamp may be transmitted, e.g., to time module 270, via an interconnect, e.g., interconnect 211. Time module 270 may generate the time stamp and buffer it until the corresponding trace message arrives. The trace message may arrive at attachment circuit 260, e.g., via a trace network 250, or other connection from the various trace sources, e.g., RF transceiver 806, baseband modem 700, application processor, and optional SIM 808. As discussed above, attachment circuit 260 may be configured to match the time stamp that corresponds to the trace message and attach the time stamp to the trace message. Output 241 may output the trace message with the attached time stamp, as well as trace protocol.

In an aspect of the disclosure, Example 1 may be a circuit including: a trace source configured to request a time stamp to correspond to a trace message; a time module configured to generate the time stamp and buffer the time stamp; and an attachment circuit configured to match the time stamp that corresponds to the trace message and attach the time stamp to the trace message.

Example 2 may include the circuit of Example 1, wherein the trace source is external to the time module.

Example 3 may include the circuit of one of Examples 1 and 2, wherein the trace source transmits a request for the time stamp to the time module.

Example 4 may include the circuit of Example 3, wherein the request is transmitted on a single dedicated interconnect.

Example 5 may include the circuit of Example 4, wherein the single dedicated interconnect is a wire.

Example 6 may include the circuit of one of Examples 1-5, wherein the time stamp indicates a time the trace message is generated.

Example 7 may include the circuit of one of Examples 1-6, wherein the trace message includes an event record executed by the trace source.

Example 8 may include the circuit of Example 7, wherein the event record includes at least one of: audio frame processing completion, radio frame processing completion, arrival interruption, communication flag setting, data processing requesting, messaging, signaling data availability, memory access start, memory access completion, network page reception, data reception, data transmission, software state change, error occurrence, warning occurrence, and/or unexpected event occurrence.

Example 9 may include the circuit of one of Examples 1-8, the circuit further including: at least one additional trace source.

Example 10 may include the circuit of one of Examples 1-9, wherein the time module includes a clock.

Example 11 may include the circuit of one of Examples 1-10, wherein the time module further includes: a buffer configured to queue the time stamp.

Example 12 may include the circuit of Example 11, wherein the buffer is a FIFO (first in, first out).

Example 13 may include the circuit of Example 11, wherein the buffer is a latch.

Example 14 may include the circuit of Example 11, wherein the buffer is a shift register.

Example 15 may include the circuit of Example 11, wherein the buffer is a memory.

Example 16 may include the circuit of Example 15, wherein the buffer is static random access memory.

Example 17 may include the circuit of Example 11, wherein the buffer is a flip-flop.

Example 18 may include the circuit of Example 11, wherein the buffer includes: a read and write pointer; memory; and a control circuit.

Example 19 may include the circuit of one of Examples 11, 12, and 14-18, wherein the buffer is further configured to queue at least one additional time stamp that corresponds to the trace source.

Example 20 may include the circuit of one of Examples 11-19, wherein the time module further includes: at least one additional buffer configured to queue a time stamp that corresponds to at least one additional trace source.

Example 21 may include the circuit of one of Examples 1-20, the circuit further including: a trace target.

Example 22 may include the circuit of Example 21, wherein the trace target is configured to receive the trace message.

Example 23 may include the circuit of Example 21, wherein the trace target is configured to output the trace message including the time stamp attached to the trace message.

Example 24 may include the circuit of Example 21, wherein the trace target is configured to generate trace protocol.

Example 25 may include the circuit of one of Examples 1-24, wherein the trace message further includes: a trace source identifier.

Example 26 may include the circuit of Example 25, wherein the attachment circuit is configured to receive and match the trace message by the trace source identifier.

Example 27 may include the circuit of Example 25, wherein the trace target is configured to receive and match the trace message by the trace source identifier.

Example 28 may include the circuit of one of Examples 11-27, wherein the time module is further configured to dequeue the time stamp from the buffer that corresponds to the trace source of the trace message.

Example 29 may include the circuit of one of Examples 21-27, wherein the trace target is further configured to dequeue the time stamp from the buffer that corresponds to the trace source of the trace message and attach the time stamp to the trace message.

Example 30 may include the circuit of one of Examples 1-29, the circuit further including: a trace network configured to route the trace message from the trace source.

Example 31 may include the circuit of Example 30, wherein the trace network is further configured to indicate the trace message was dropped.

Example 32 may include the circuit of one of Examples 30 and 31, wherein the trace message is routed to the attachment circuit.

Example 33 may include the circuit of Example 11, the circuit further including: a trace network configured to route the trace message from the trace source.

Example 34 may include the circuit of Example 33, wherein the trace message is routed to the attachment circuit.

Example 35 may include the circuit of Example 34, wherein the time module is further configured to discard the time stamp corresponding to the trace source from the buffer if the trace message was indicated as dropped.

Example 36 may include the circuit of one of Examples 30 and 31, wherein the trace message is routed to a trace target.

Example 37 may include the circuit of Example 36, wherein the trace network indicates the dropped trace message to the trace target.

Example 38 may include the circuit of one of Examples 1-29, wherein the trace message further includes: a sequence identifier that indicates a sequential position of the trace message in a series of generated trace messages from the trace source.

Example 39 may include the circuit of Example 38, wherein the time module is further configured to: obtain the sequence identifier of the trace message for the trace source; track a previous sequence identifier of a previous trace message; and determine if the sequence identifier of the trace message sequentially follows the previous sequence identifier of the previous trace message.

Example 40 may include the circuit of Example 11, wherein the trace message further includes: a sequence identifier that indicates a sequential position of the trace message in a series of generated trace messages from the trace source.

Example 41 may include the circuit of Example 40, wherein the time module is further configured to: obtain the sequence identifier of the trace message for the trace source; track a previous sequence identifier of a previous trace message; and determine if the sequence identifier of the trace message sequentially follows the previous sequence identifier of the previous trace message.

Example 42 may include the circuit of Example 41, wherein the time module is further configured to: discard at least one time stamp from the buffer if the sequence identifier of the trace message does not sequentially follow the previous sequence identifier of the previous trace message.

In an aspect of the disclosure, Example 43 may include an integrated circuit including the circuit of any of Examples 1-42.

In an aspect of the disclosure, Example 44 may include a system on a chip including the circuit of any of Examples 1-42.

In an aspect of the disclosure, Example 45 may include a baseband modem including the circuit of any of Examples 1-42.

In an aspect of the disclosure, Example 46 may include a mobile communications device processor including the circuit of any of Examples 1-42.

In an aspect of the disclosure, Example 47 may include a mobile communications device including the circuit of any of Examples 1-42.

In an aspect of the disclosure, Example 48 may include a debug system including the circuit of any of Examples 1-42.

In an aspect of the disclosure, Example 49 may be a circuit including: a trace source configured to request a time stamp to correspond to a trace message; a time means for remotely generating and buffering the time stamp; and an attachment means for matching the time stamp that corresponds to the trace message and attaching the time stamp to the trace message.

Example 50 may include the circuit of Example 49, wherein the trace source is external to the time means.

Example 51 may include the circuit of one of Examples 49 and 50, wherein the trace source transmits a request for the time stamp to the time means.

Example 52 may include the circuit of Example 51, wherein the request is transmitted on a single dedicated interconnect.

Example 53 may include the circuit of Example 52, wherein the single dedicated interconnect is a wire.

Example 54 may include the circuit of one of Examples 49-53, wherein the time stamp indicates a time the trace message is generated.

Example 55 may include the circuit of one of Examples 49-54, wherein the trace message includes an event record executed by the trace source.

Example 56 may include the circuit of Example 55, wherein the event record includes at least one of: audio frame processing completion, radio frame processing completion, arrival interruption, communication flag setting, data processing requesting, messaging, signaling data availability, memory access start, memory access completion, network page reception, data reception, data transmission, software state change, error occurrence, warning occurrence, and/or unexpected event occurrence.

Example 57 may include the circuit of one of Examples 49-56, the circuit further including: at least one additional trace source.

Example 58 may include the circuit of one of Examples 49-57, the circuit further including: a trace target.

Example 59 may include the circuit of Example 58, wherein the trace target is configured to receive the trace message.

Example 60 may include the circuit of Example 59, wherein the trace target is configured to output the trace message and the time stamp attached to the trace message.

Example 61 may include the circuit of one of Examples 58-60, wherein the trace target is configured to generate trace protocol.

Example 62 may include the circuit of one of Examples 49-61, wherein the trace message further includes: a trace source identifier.

Example 63 may include the circuit of Example 62, wherein the attachment means further receives and matches the trace message by the trace source identifier.

Example 64 may include the circuit of Example 62, wherein the trace target is configured to receive and match the trace message by the trace source identifier.

Example 65 may include the circuit of one of Examples 49-64, wherein the attachment means further dequeues the time stamp and attaches the time stamp to the trace message.

Example 66 may include the circuit of one of Examples 49-65, the circuit further including: a trace network configured to route the trace message from the trace source.

Example 67 may include the circuit of Example 66, wherein the trace network is further configured to indicate the trace message was dropped.

Example 68 may include the circuit of one of Examples 66 and 67, wherein the trace message is routed to the attachment means.

Example 69 may include the circuit of one of Examples 66-68, wherein the time means further discards the time stamp corresponding to the trace source if the trace message was indicated as dropped.

Example 70 may include the circuit of one of Examples 66 and 67, wherein the trace message is routed to a trace target.

Example 71 may include the circuit of Example 70, wherein the trace network indicates the dropped trace message to the trace target.

Example 72 may include the circuit of one of Examples 49-65, wherein the trace message further includes: a sequence identifier that indicates a sequential position of the trace message in a series of generated trace messages from the trace source.

Example 73 may include the circuit of Example 72, wherein the time means further obtains the sequence identifier of the trace message for the trace source; tracks a previous sequence identifier of a previous trace message; and determines if the sequence identifier of the trace message sequentially follows the previous sequence identifier of the previous trace message.

Example 74 may include the circuit of Example 73, wherein the time means further discards at least one time stamp if the sequence identifier of the trace message does not sequentially follow the previous sequence identifier of the previous trace message.

In an aspect of the disclosure, Example 75 may include an integrated circuit including the circuit of any of Examples 49-74.

In an aspect of the disclosure, Example 76 may include a network on a chip including the circuit of any of Examples 49-74.

In an aspect of the disclosure, Example 77 may include a baseband modem including the circuit of any of Examples 49-74.

In an aspect of the disclosure, Example 78 may include a mobile communications device processor including the circuit of any of Examples 49-74.

In an aspect of the disclosure, Example 79 may include a mobile communications device including the circuit of any of Examples 49-74.

In an aspect of the disclosure, Example 80 may include a debug system including the circuit of any of Examples 49-74.

In an aspect of the disclosure, Example 81 may include a method for attaching a time stamp to a trace message, the method including: requesting by a trace source a time stamp to correspond to a trace message; generating the time stamp in a time module; buffering the time stamp in the time module; matching the time stamp that corresponds to the trace message; and attaching the time stamp to the trace message.

Example 82 may include the method of Example 81, wherein the time stamp is requested by the trace source that generates the trace message.

Example 83 may include the method of one of Examples 81 and 82, wherein the trace source is external to the time module.

Example 84 may include the method of one of Examples 81-83, wherein requesting the time stamp to correspond to the trace message further includes: transmitting a request for the time stamp to the time module.

Example 85 may include the method of Example 84, wherein the request is transmitted on a single dedicated interconnect.

Example 86 may include the method of Example 85, wherein the single dedicated interconnect is a wire.

Example 87 may include the method of one of Examples 81-86, wherein the time stamp indicates a time the trace message is generated.

Example 88 may include the method of one of Examples 81-87, wherein the trace message includes an event record executed by the trace source.

Example 89 may include the method of Example 88, wherein the event record includes at least one of: audio frame processing completion, radio frame processing completion, arrival interruption, communication flag setting, data processing requesting, messaging, signaling data availability, memory access start, memory access completion, network page reception, data reception, data transmission, software state change, error occurrence, warning occurrence, and/or unexpected event occurrence.

Example 90 may include the method of one of Examples 81-89, wherein the time stamp is requested by one of a plurality of trace sources.

Example 91 may include the method of one of Examples 81-90, wherein the time module includes a clock.

Example 92 may include the method of one of Examples 81-91, wherein the time module further includes: a buffer configured to queue the time stamp.

Example 93 may include the method of Example 92, wherein the buffer is a FIFO (first in, first out).

Example 94 may include the method of Example 92, wherein the buffer is a latch.

Example 95 may include the method of Example 92, wherein the buffer is a shift register.

Example 96 may include the method of Example 92, wherein the buffer is a memory.

Example 97 may include the method of Example 96, wherein the buffer is static random access memory.

Example 98 may include the method of Example 92, wherein the buffer is a flip-flop.

Example 99 may include the method of Example 92, wherein the buffer includes: a read and write pointer; memory; and a control circuit.

Example 100 may include the method of one of Examples 92, 93, and 95-99, wherein the buffer is further configured to queue a plurality of time stamps that correspond to the trace source.

Example 101 may include the method of one of Examples 92-100, wherein the time module further includes: at least one additional buffer configured to queue a time stamp that corresponds to at least one additional trace source.

Example 102 may include the method of one of Examples 81-101, wherein matching the time stamp that corresponds to the trace message further includes, receiving the trace message and identifying the trace source that corresponds to the trace message.

Example 103 may include the method of one of Examples 81-102, wherein the trace message further includes: a trace source identifier.

Example 104 may include the method of Examples 103, wherein an attachment circuit receives and matches the trace message by the trace source identifier.

Example 105 may include the method of Example 103, wherein a trace target receives and matches the trace message by the trace source identifier.

Example 106 may include the method of one of Examples 81-105, wherein attaching the time stamp to the trace message further includes: dequeuing the time stamp from the buffer that corresponds to the trace source of the trace message.

Example 107 may include the method of Example 106, wherein an attachment circuit attaches the time stamp to the trace message.

Example 700 may include the method of Example 106, wherein a trace target attaches the time stamp to the trace message.

Example 109 may include the method of Example 92, the method further including: routing the trace message via a trace network from the trace source; indicating the trace message was dropped; and discarding the time stamp corresponding to the trace source from the buffer.

Example 110 may include the method of Example 109, wherein the trace network indicates the trace message was dropped.

Example 111 may include the method of one of Examples 109 and 110, wherein the trace message is routed to an attachment circuit.

Example 112 may include the method of Example 111, wherein the trace network indicates the dropped trace message to the time module.

Example 113 may include the method of one of Examples 109 and 110, wherein the trace message is routed to a trace target.

Example 114 may include the method of Example 113, wherein the trace network indicates the dropped trace message to the trace target.

Example 115 may include the method of one of Examples 81-700, the method further including: attaching a sequence identifier to the trace message that indicates a sequential position of the trace message in a series of generated trace messages from the trace source.

Example 116 may include the method of Example 116, wherein matching the time stamp that corresponds to the trace message further includes: obtaining the sequence identifier of the trace message for the trace source; tracking a previous sequence identifier of a previous trace message; and determining if the sequence identifier of the trace message sequentially follows the previous sequence identifier of the previous trace message.

Example 117 may include the method of Example 92, the method further including: attaching a sequence identifier to the trace message that indicates a sequential position of the trace message in a series of generated trace messages from the trace source.

Example 118 may include the method of Example 117, wherein matching the time stamp that corresponds to the trace message further includes: obtaining the sequence identifier of the trace message for the trace source; tracking a previous sequence identifier of a previous trace message; and determining if the sequence identifier of the trace message sequentially follows the previous sequence identifier of the previous trace message.

Example 119 may include the method of Example 118, wherein matching the time stamp that corresponds to the trace message further includes: discarding at least one time stamp from the buffer if the sequence identifier of the trace message does not sequentially follow the previous sequence identifier of the previous trace message.

In an aspect of the disclosure, Example 120 may include an integrated circuit configured to perform the method of any of Examples 81-119.

In an aspect of the disclosure, Example 121 may include a network on a chip configured to perform the method of any of Examples 81-119.

In an aspect of the disclosure, Example 122 may include a baseband modem configured to perform the method of any of Examples 81-119.

In an aspect of the disclosure, Example 123 may include a mobile communications device processor configured to perform the method of any of Examples 81-119.

In an aspect of the disclosure, Example 124 may include a mobile communications device configured to perform the method of any of Examples 81-119.

In an aspect of the disclosure, Example 125 may include a debug system configured to perform the method of any of Examples 81-119.

In an aspect of the disclosure, Example 126 may include a non-transitory computer readable medium configured to perform the method of any of Examples 81-119.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. An integrated circuit, comprising:
a trace source circuit component configured to transmit a request signal indicative of a request for a time stamp corresponding to a trace message that includes an event record executed by the trace circuit component, the event record including at least one of an audio frame processing completion, a radio frame processing completion, an arrival interruption, a software state change, and/or unexpected event occurrence;
a time stamp circuit configured to generate the time stamp and buffer the time stamp in response to the transmitted request signal;
a trace target circuit component configured to generate a trace protocol;
a time stamp attachment circuit configured to match the time stamp corresponding to the trace message and attach the time stamp to the trace message; and
a trace routing network configured to indicate, to the trace target circuit component that the trace message was dropped,
wherein the trace message further includes a sequence identifier that indicates a sequential position of the trace message in a series of generated trace messages from the trace source circuit component, and
wherein the time stamp circuit is further configured to (i) obtain the sequence identifier of the trace message for the trace source circuit component, (ii) track a previous sequence identifier of a previous trace message, (iii) determine if the sequence identifier of the trace message sequentially follows the previous sequence identifier of the previous trace message, and (iv) discard at least one time stamp from the buffer circuit if the sequence identifier of the trace message is out of sequence from the previous sequence identifier of the previous trace message,
wherein the trace source circuit component is from among a plurality of trace source circuit components, each trace source circuit component from among the plurality of trace source circuit components being configured to transmit a respective request signal indicative of a request for a time stamp corresponding to a trace message, the time stamp circuit being common to each of the plurality of trace source circuit components.

2. The integrated circuit of claim 1, wherein the time stamp circuit further comprises:
a buffer circuit configured to queue the time stamp.

3. The integrated circuit of claim 1, wherein the trace message further comprises:
a trace source identifier.

4. The integrated circuit of claim 3, wherein the time stamp attachment circuit is configured to receive and match the trace message by the trace source identifier.

5. The integrated circuit of claim 2, wherein the time stamp circuit is further configured to remove the time stamp from a queue in the buffer circuit corresponding to the trace source of the trace message.

6. The integrated circuit of claim 1,
wherein the trace routing network is configured to route the trace message from the trace source circuit component.

7. The integrated circuit of claim 1, wherein the time stamp circuit is further configured to discard the time stamp corresponding to the trace source circuit component from the buffer circuit if the trace message was indicated as dropped.

8. An integrated circuit comprising:
a trace source circuit component configured to request a time stamp to correspond to a trace message that includes an event record executed by the trace circuit component, the event record including at least one of an audio frame processing completion, a radio frame processing completion, an arrival interruption, a software state change, and/or unexpected event occurrence;
a time means for remotely generating and buffering the time stamp;
a trace target circuit component configured to generate a trace protocol;
an attachment means for matching the time stamp corresponding to the trace message and attaching the time stamp to the trace message; and
a trace routing network configured to indicate, to the trace target circuit component that the trace message was dropped,
wherein the trace message further includes a sequence identifier that indicates a sequential position of the trace message in a series of generated trace messages from the trace source circuit component, and
wherein the time means further (i) obtains the sequence identifier of the trace message for the trace source circuit component, (ii) tracks a previous sequence identifier of a previous trace message, (iii) determines if the sequence identifier of the trace message sequentially follows the previous sequence identifier of the previous trace message, and (iv) discards at least one time stamp if the sequence identifier of the trace message is out of sequence from the previous sequence identifier of the previous trace message,
wherein the trace source circuit component is from among a plurality of trace source circuit components, each trace source circuit component from among the plurality of trace source circuit components being configured to transmit a respective request signal indicative of a request for a time stamp corresponding to a trace message, the time means being common to each of the plurality of trace source circuit components.

9. The integrated circuit of claim 8, wherein the trace message further comprises:
a trace source identifier.

10. The integrated circuit of claim 9, wherein the attachment means further receives and matches the trace message by the trace source identifier.

11. The integrated circuit of claim 8,
wherein the trace routing network is configured to route the trace message from the trace source circuit component.

12. The integrated circuit of claim 11, wherein the trace message is routed to the attachment means.

13. The integrated circuit of claim 11, wherein the time means further discards the time stamp corresponding to the trace source circuit component if the trace message was indicated as dropped.

14. A method for attaching a time stamp to a trace message in an integrated circuit, the method comprising:
requesting, by a trace source circuit component from among a plurality of trace source circuit components, a time stamp to correspond to a trace message that includes an event record executed by the trace circuit component, the event record including at least one of an audio frame processing completion, a radio frame processing completion, an arrival interruption, a software state change, and/or unexpected event occurrence;
generating, via a time stamp circuit common to each of the plurality of trace source circuit components, the time stamp;
generating, via a trace circuit component, a trace protocol;
indicating to the trace target circuit component, via a trace routing network, that the trace message was dropped;
buffering, via the time stamp circuit, the time stamp;
matching, via a time stamp attachment circuit, the time stamp corresponding to the trace message;
attaching, via the time stamp attachment circuit, the time stamp to the trace message, the trace message further including a sequence identifier that indicates a sequential position of the trace message in a series of generated trace messages from the trace source circuit component;
obtaining, via the time stamp circuit, the sequence identifier of the trace message for the trace source circuit component;
tracking, via the time stamp circuit, a previous sequence identifier of a previous trace message;
determining, via the time stamp circuit, if the sequence identifier of the trace message sequentially follows the previous sequence identifier of the previous trace message; and
discarding, via the time stamp circuit, at least one time stamp if the sequence identifier of the trace message is out of sequence from the previous sequence identifier of the previous trace message.

15. The method of claim 14, further comprising: queuing, via the time stamp circuit,
the time stamp.

16. The integrated circuit of claim 1, wherein the discarded at least one time stamp corresponds to a dropped trace message.

17. The integrated circuit of claim 1, wherein the trace source circuit component is further configured to attach a monotonically increasing message sequence number (MSN) to the trace message, and
wherein the trace circuit component is further configured to track previously determined MSN rules to determine a number of trace messages that have been lost.

* * * * *